United States Patent

Collier

[11] 4,193,484
[45] Mar. 18, 1980

[54] ROTARY HYDROSTATIC COUPLING

[76] Inventor: Samuel A. Collier, 1714-S. Olive, Pittsburg, Kans. 66762

[21] Appl. No.: 893,949

[22] Filed: Apr. 6, 1978

[51] Int. Cl.$^2$ .................... F16D 31/00; F16D 43/284
[52] U.S. Cl. ................................ 192/60; 192/103 FA
[58] Field of Search ................ 192/60, 56 F, 103 FA

[56] References Cited

U.S. PATENT DOCUMENTS

| 950,368 | 2/1910 | Cheyne | 192/60 |
|---|---|---|---|
| 1,173,622 | 2/1916 | Tompkins | 192/60 |
| 1,675,438 | 7/1928 | Walsh et al. | 192/60 |
| 1,789,506 | 1/1931 | Walker | 192/60 |
| 1,832,568 | 11/1931 | Moreland | 192/60 |
| 4,142,617 | 3/1979 | Collier | 192/60 |

FOREIGN PATENT DOCUMENTS 605125 5/1960 Italy .......................................... 192/60

*Primary Examiner*—Allan D. Herrmann
*Attorney, Agent, or Firm*—Edward R. Lowndes

[57] ABSTRACT

A rotary hydraulic coupling wherein the rotary motion of a fluid-filled casing is transmitted to a coaxial driven shaft through the medium of a plurality of pistons which have eccentric drive connections with the driven shaft and which work in cylinders that are radially disposed within the casing. Fluid within the casing is pumped by the pistons from a reservoir area within the casing to a manifold area while control valve mechanism variously regulates the bleeding or flow of fluid from the manifold area back to the reservoir area. The cylinders are charged with fluid from a high pressure region of the reservoir which exists by reason of centrifugal force acting through the radial depth of the fluid, such fluid entering the cylinders through intake check valves which are mechanically assisted in their opening movements to insure charging at low differential speeds. Fluid is expelled from the cylinder to the manifold through output check valves and the pressure which builds up in the manifold creates a back-up pressure in the cylinders which is translated into the application of torque to the driven shaft. The control valve mechanism which regulates bleeding of the manifold includes a control valve proper of the balanced spool type and a metering valve which regulates the operation of the control valve so that the rate of manifold bleeding may be varied within a wide range lasting from only a fraction of a second to several minutes. The valve mechanism further includes a pressure relief valve which also is of the balance spool type and which bleeds the manifold to the reservoir independently of the control valve when an overload on the driven shaft occurs.

16 Claims, 7 Drawing Figures

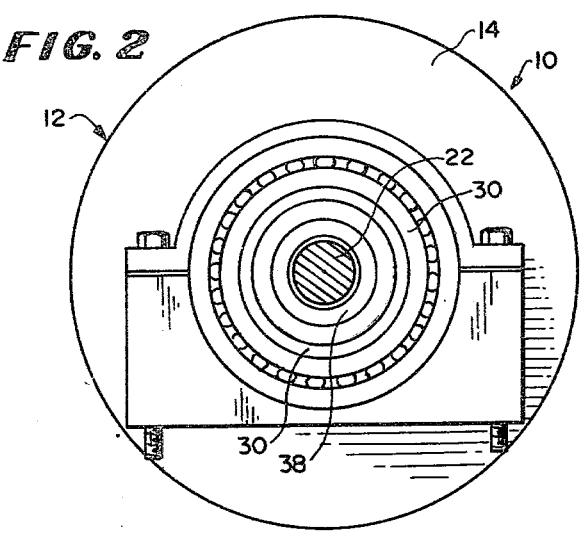
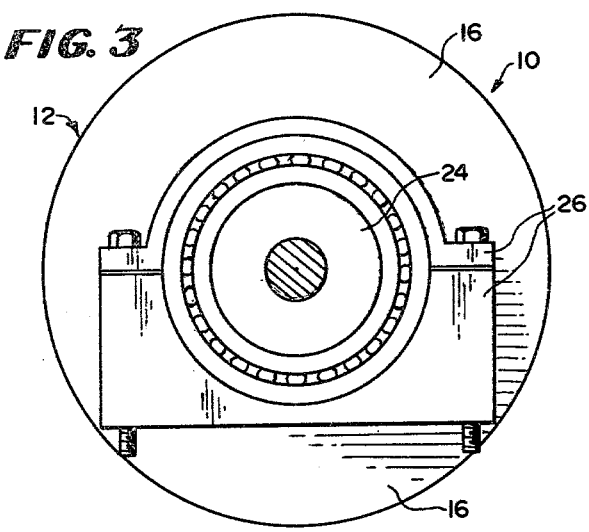
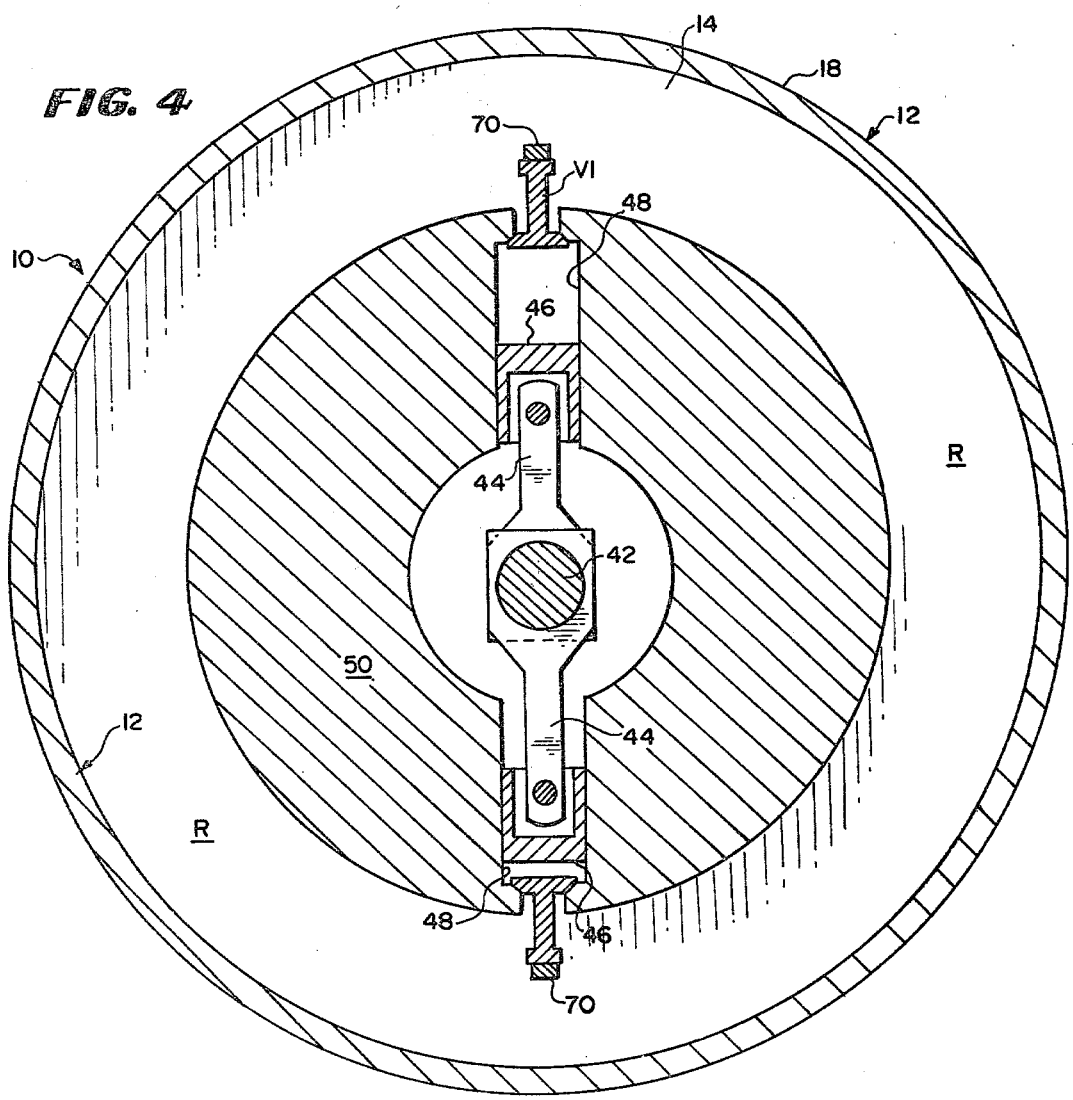

ROTARY HYDROSTATIC COUPLING

The present invention relates generally to transmission mechanisms and more particularly to rotary hydraulic couplings of the general type wherein the rotary motion of a drive shaft is transmitted to a driven shaft under the influence of the compressive force of a fluid which acts against a plurality of radially disposed pistons that are carried by one of said shafts and which work in cylinders that are enclosed within a fluid-filled housing which establishes a fluid reservoir and which is carried by the other shaft, inflow and outflow check valve means being provided for controlling the flow of fluid to and from the cylinders to vary the back-up pressure in the cylinders, and consequently the torque which is impressed upon the driven shaft by the drive shaft.

Exemplary of an hydraulic coupling of the general type outlined above is the coupling shown and described in my copending U.S. application Ser. No. 861,704, filed on Dec. 18, 1977 (now U.S. Pat. No. 4,142,167, granted on Mar. 6, 1979) and entitled "Rotary Hydraulic Coupling," and over which the present coupling is an improvement. Also exemplary of such a coupling is U.S. Pat. No. 1,173,622, granted on Feb. 19, 1916 and entitled "Transmission Mechanism." Additional patents relating to hydrostatic couplings wherein the transmission of torque to a driven shaft is attained by a piston-compressed fluid are to be found in Class 192 and particularly Sub-class 60, several of these being listed in the foregoing prior art citation.

Heretofore, in connection with hydrostatic couplings of the general type under consideration, it has invariably been the practice to cause the fluid-filled housing to rotate in unison with the driven shaft, and to establish an eccentric drive connection from the drive shaft to the various radially disposed pistons. The net result of such an arrangement is that fluid is drawn into the cylinders through the inflow valves from the reservoir under vacuum pressure and is returned to the reservoir through the outflow valves under compression.

In the structure of my aforementioned copending application, Ser. No. 861,704, the outflow valves leading from the cylinders communicate with a fluid manifold and additional regulatory valve means are provided for controlling the rate of flow of fluid from the manifold back to the reservoir, this being a distinguishing feature of such application. It has been found both in connection with my earlier structure, as well as with certain of the structures of the prior art, positive admission of fluid to the various cylinders for charging purposes does not take place throughout the entire speed range of the coupling. This is due to several factors, one of which resides in the fact that with all such couplings a small amount of air invariably is entrained within the fluid in the reservoir. As the pistons perform their instrokes this air is drawn along with the fluid under vacuum pressure into the cylinders where it expands and results in a delayed opening of the spring-biased inflow valves. Another factor which causes irregular opening of the inflow valves is centrifugal force which acts on the valve bodies in varying degrees depending upon the rotational speed of the fluid filled housing. At low housing speeds small vacuum pressure will draw the spring-biased inflow valves open while at high speeds considerably greater vacuum pressure is required to maintain the inflow valves in their open condition.

The hydrostatic coupling of the present invention is designed as an improvement over my earlier coupling, as well as over certain similar prior art couplings in that it affords a more positive charging of the cylinders than has heretofore been considered possible. Accordingly, although the housing structure including the reservoir, manifold and cylinders, as well as the pistons and their eccentric driving arrangement remain structurally similar to the corresponding parts of my earlier coupling, the fluid filled housing which establishes the reservoir, the manifold and the various valve arrangements are carried by the drive shaft, while the piston arrangement including the eccentric connections thereto is carried by and operates upon the driven shaft. By thus driving the housing at input motor speed, it may attain speed rapidly so that the body of fluid within the same will be acted upon by centrifugal force, thereby establishing an immediate and relatively high fluid pressure in the peripheral regions of the housing. Since the reservoir is in the form of a peripheral annulus, the high pressure which is built up in this outer annular region causes fluid to be forced into the various cylinders for cylinder charging and piston driving purposes through intake valves which, instead of being spring-biased to their closed positions, are free floating valves so that the only force acting on them for valve closing purposes is centrifugal force. Since the manifold with which the cylinders communicate is disposed radially inwardly of the reservoir, the pressure of fluid in such manifold is initially considerably less than the pressure of the fluid in the reservoir and, as a consequence, the higher pressure of fluid in the reservoir has little difficulty in pushing past the free floating intake valves and thus charging the cylinders even at low differential speeds. This is especially true during starting up operations. Subsequently, as more and more fluid is built up in the manifold and back pressure takes place in the cylinders, mechanical means are provided for forcing the intake valves to their open positions against the increasing action of centrifugal force which, otherwise, would act upon the valve bodies and urge them toward their closed position and restrict the flow of fluid into the cylinders for charging purposes. In any event, regardless of the speed at which the drive housing is rotating, the charging of the cylinders with fluid under positive pressure is considerably more effective than charging the cylinders with fluid under vacuum pressure, especially when considering the presence of air bubbles or pockets in the fluid as previously indicated. Under negative pressure such air masses tend to expand and destroy the effectiveness of the vacuum, while under positive pressure such air masses are compressed and have little or no effect upon the compressive driving force of the fluid against the pistons.

In addition to enhancing the charging of the cylinders with fluid by causing the fluid-containing housing to constitute the driving member of the coupling and by effecting positive mechanical opening of the intake valves which lead to the various cylinders as briefly outlined above, numerous other advantages are inherent in the present invention. One such advantage arises from the fact that the housing is considerably more massive than the combined mass of the pistons and their associated eccentric connections to the driven shaft and thus, when such housing is rotating it has appreciably more momentum than does the driven or output shaft.

By reason of this, the output shaft may be braked or even stopped completely in a very short length of time without causing overstress on the driven parts associated therewith. Another advantage resides in the fact that the rapid attainment of speed by the housing shortly after starting up operations causes any small impurities such as small particles of foreign matter within the body of fluid contained within the housing to be forced or flung by centrifugal action to the rim region of the housing and thus kept free from the various valves and other working parts of the unit thus, in effect, acting in the manner of a filter which segregates such particles as have a specific gravity greater than that of the fluid.

A further advantage of the present coupling resides in the provision of a novel mechanical means for effecting opening of the intake valves which lead from the reservoir to the various cylinders, such means assuming the form of a cam which is mounted on the driven shaft and which cooperates with a series of push rods that operate through the medium of respective rocker arms to positively force the intake valves to their open positions at the proper points in the cycle for cylinder intake or charging purposes and to allow such intake valves to close at the proper point for cylinder discharge purposes during the compression strokes of the pistons. It will be understood, of course, that since the housing constitutes the driving element of the hydrostatic coupling, such compression stroke of each piston drives the latter in a direction tending to apply torque to the driven shaft through the medium of the associated eccentric connection leading to the driven shaft. The pistons therefore are driven elements as distinguished from driving elements as is the case in connection with my earlier hydrostatic coupling. According to the present invention, the aforementioned cam is adjustably mounted on the driven shaft and, is capable of being circumferentially rotated on such shaft throughout an angle of 180° in order to accommodate reverse directional rotation of the drive shaft and its associated housing.

As in the case in connection with the earlier hydrostatic coupling of my copending application, Ser. No. 861,704, fully automatic control mechanism in the form of internal fluid passages and valving arrangements are effective without any attention on the part of an operator to regulate the bleeding of the manifold to the reservoir in order to vary the rate at which back up pressure is developed in the various cylinders, it being understood of course that the lack of any back up pressure in the cylinders will attain a neutral condition where rotation of the housing will impart no torque to the driven shaft while full back up pressure in the cylinders establishes a locked up or static condition wherein the driven shaft will rotate in unison with the housing due to the incompressibility of the fluid. While the automatic control mechanism of the present invention functions, generally speaking, in a manner similar to the control mechanism of my earlier coupling, it has been simplified to some extent. One of the features which has been retained in the present control mechanism resides in the use of a variable time delay which becomes effective before full input torque is applied to the drive shaft. This time delay period is adjustable from a few seconds to several minutes and, during such period, a gradual torque increase is applied to the driven shaft. Varying of the time delay period is accomplished by presetting operations which may be accomplished exteriorly of the housing without necessitating any dismantling operations. Other advantageous features of my earlier coupling have been carried forward into the present coupling and these will become readily apparent as the following description ensues. An understanding of the present hydrostatic coupling may be facilitated by reference to my aforementioned application, Ser. No. 861,704, the entire disclosure of which, insofar as it is consistent with the present disclosure, is hereby incorporated in and made a part of this application by reference thereto.

The provision of a hydrostatic coupling such as has briefly been outlined above and possessing the stated advantages constitutes the principal object of the present invention. Numerous other objects and advantages of the invention, not at this time set forth will become readily apparent as the nature of the invention is better understood.

In the accompanying three sheets of drawings forming a part of this specification, one illustrative embodiment of the invention has been shown.

In these drawings:

FIG. 2 is a left hand view of the structure illustrated in FIG. 1;

FIG. 3 is a right hand view of the structure shown in FIG. 1;

FIG. 4 is a sectional view taken substantially on the line 4—4 of FIG. 1;

Figure 1:
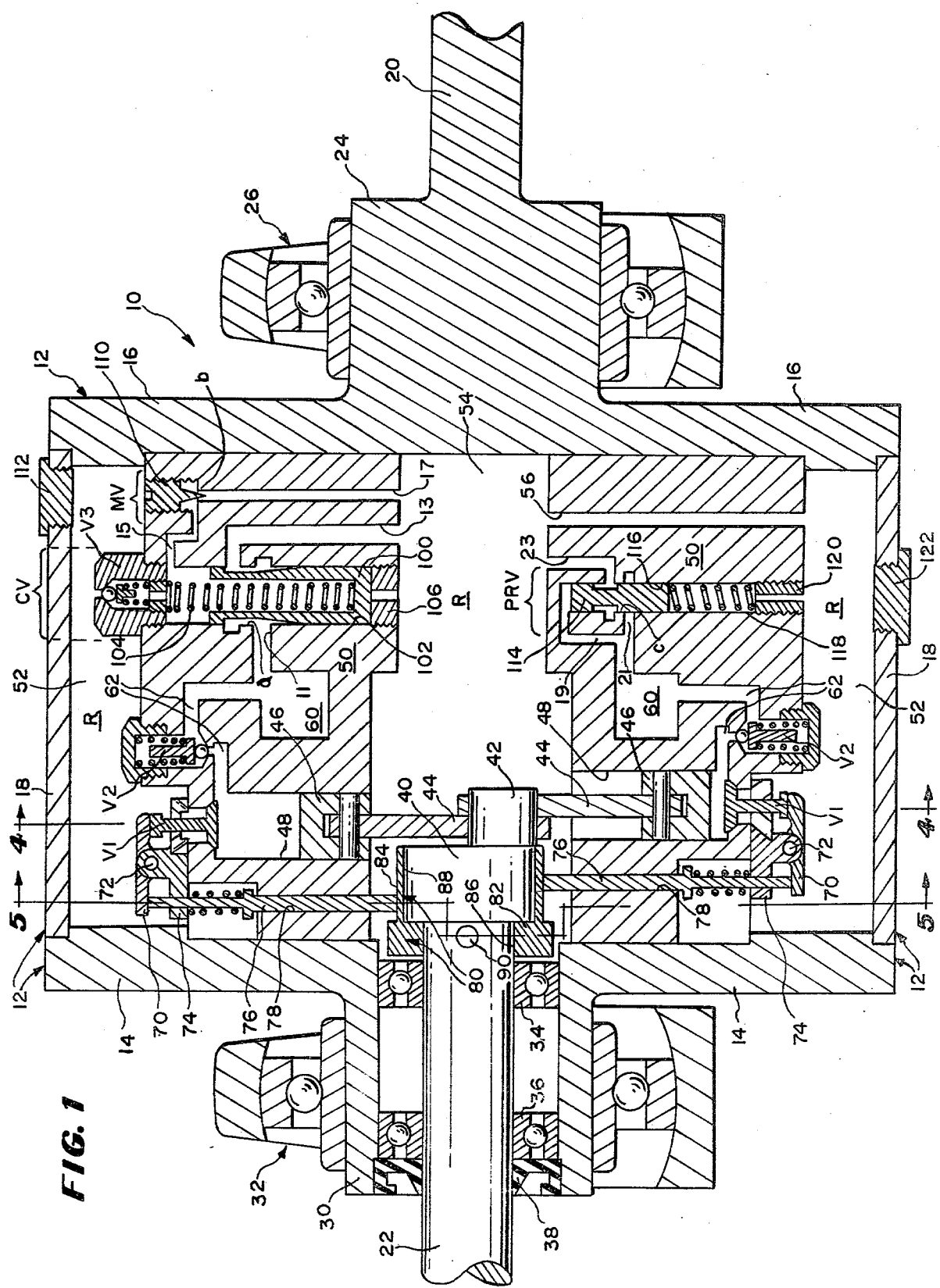
FIG. 1 is a sectional view, largely schematic in its representation, taken substantially centrally and longitudinally through a hydrostatic coupling embodying the principles of the present invention.

Referring now to the drawings in detail, and in particular to FIGS. 1 and 2, a hydrostatic coupling embodying the principles of the present invention is designated in its entirety by the reference numeral 10 and it embodies a generally cylindrical casing 12 having opposed circular end walls 14 and 16 and an outer cylindrical wall 18. The function of the coupling 10 is to translate the rotary motion of an input or drive shaft 20 to an output or driven shaft 22 in such a manner that it permits the drive shaft 20 and its casing 12 to attain normal running speed rapidly while at the same time bringing the driven shaft 22 gradually up to the same speed but at a considerably reduced rate of acceleration, all in a manner that will be made clear presently.

The input shaft 20 is preferably, but not necessarily, integrally formed with the wall 16 although it may be bolted or otherwise secured to the casing if desired, the only requisite being that it rotate bodily with the casing so as to constitute a driving member therefor. The output or driven shaft 22 is separate from the casing and it projects into the latter through the wall 14, the two shafts being axially aligned with each other.

For convenience of description herein, throughout this specification and in the appended claims, the wall 16 will be regarded as the front wall and the wall 14 will be regarded as the rear wall. Thus the driving or input shaft 20 projects forwardly and outwardly of the casing 12 and it is provided with an enlarged hub 24 which is rotatably supported in a bearing assembly 26. The rear wall 14 is formed with a tubular cylindrical hub 30 which is suitably supported in a bearing assembly 32. The two bearing assemblies 26 and 32 thus constitute a bearing support for the entire rotary casing 12.

The driven shaft 22 projects through the tubular hub 30 and is rotatably supported therein by means of front and rear bearing assemblies 34 and 36. Immediately behind the rear bearing assembly 36, a suitable lip seal or the like 38 surrounds the driven shaft and retains transmission fluid within the casing which, otherwise, is fluid tight.

The forward end of the driven shaft 22 is provided with an enlarged crankhead 40 which is disposed immediately forwardly of the front bearing assembly 34, such crankhead being formed with an eccentric crank arm 42 which is connected in driven relationship by means of connecting rods 44 to a pair of pistons 46 (see also FIG. 4) which are reciprocable in a pair of diametrically disposed, radially extending cylinders 48, the axes of which are slightly misaligned in a fore and aft direction as shown in FIG. 1. The cylinders are provided in a generally annular, block-like cylinder and valve supporting structure 50 which is fixedly disposed within the casing 12 for rotation in unison therewith and which spans the distance between the front and rear walls 16 and 14. The casing 12, together with its internal annular cylinder and valve supporting structure 50, establishes a composite internal reservoir R which consists of the outer annular space 52 which exists between the structure 50 and the wall 18 and the inner central space 54 within the annular structure 50, these two spaces being in communication with each other by means of one or more radial passages 56. For convenience of description herein, the entire reservoir which includes the aforementioned inner and outer spaces 54 and 52 is designated by the reference letter or symbol R. The casing is adapted to be filled with a quantity of a suitable noncompressible fluid such as oil of the fluid transmission type.

Disposed within the annular structure and extending therearound is a continuous circular or annular manifold space 60 which will hereinafter be referred to simply as the manifold. As will be described in greater detail subsequently, the cylinders 48 are adapted to be charged with fluid from the reservoir R under the influence of the hydraulic pressure which is developed in the peripheral region 52 of the casing 12 due to centrifugal force and, during such charging of the cylinders, the back-up pressure which is developed in these cylinders serves to drive the pistons radially inwardly and thus apply torque to the driven shaft 22. Since the casing 12 which is driven by the drive shaft 20 overruns the driven shaft 22, the outward strokes of the pistons 46 expel the charged fluid from the cylinders to the manifold 60, while a control valve arrangement, the nature of which will be made clear subsequently, is carried by the structure 50 and serves variously to admit fluid back to the reservoir. It is obvious that when such valving permits a free flow of fluid from the manifold to the reservoir, although reciprocation of the pistons will take place, little or no back-up pressure will be developed in the cylinders 48 so that rotation of the casing 12 will have no effect on the driven shaft 22 and the latter will remain stationary. On the other hand, when the valving completely blocks any flow of fluid from the manifold to the reservoir, the incompressible fluid with which the cylinders have been charged will effect a lock up operation wherein the driven shaft will be caused to rotate in unison with the casing 12 while the pistons will be unable to reciprocate. When the valving allows a restricted escape of fluid from the manifold 60 to the reservoir R, the back-up pressure developed within the cylinders will initiate rotation of the driven shaft 22 at a lesser speed than that of the casing 12.

Still referring to FIG. 1, the outer end of each cylinder 48 communicates with the reservoir R through the medium of a pair of free floating cone type intake valves V1 which function generally in the manner of conventional check valves but which have associated therewith mechanical cam-operated means for positively moving the same to their open positions during the inward strokes of the pistons 46 to allow cylinder charging operations to take place. The outer end of each cylinder also communicates with the manifold 60 through a manifold inlet passage 62 within which there is disposed a normally spring-biased ball type outlet check valve V2. During charging of the cylinders 48, the valves V1 are mechanically forced to their open positions and the relatively light spring pressure exerted by the check valves V2 may allow a certain amount of fluid to be forced initially past the check valves V2 before sufficient fluid pressure is developed in the cylinders to initiate movement of the pistons 46. This is particularly true if the load upon the driven shaft 22 is relatively great. However, as soon as the fluid which thus passes through the check valves V2 and enters the manifold 60 increases the pressure in the manifold to such an extent that it equals the pressure of fluid in the cylinders, the check valves V2 will become seated and further charging of the cylinders will act upon the pistons 46 for piston impelling purposes. During the outward movement of the pistons 46, all of the fluid which has been forced into the cylinders 48 during the charging operation will be expelled past the output valves V2 and enter the manifold 60 since the cam pressure on the valves V1 is relieved at this time, thereby allowing the valves V1 to become seated.

The cam actuated means for causing positive mechanical opening of the intake valves V1 at the commencement of the outstroke of the pistons 46 is best illustrated in FIGS. 1, 2, 5, 6 and 7. As best shown in FIGS. 1, 2 and 3, each valve V1 is adapted to be actuated by means of a rocker arm 70 which functions in the manner of a first class lever and the medial region of which is fulcrumed on a pin 72 which is carried by a supporting block 74 suitably mounted on the valve supporting block 50 in the immediate vicinity of the valve. One leg of the lever overlies and cooperates with the stem of the valve V1 while the other leg overlies and cooperates with the upper end of an elongated and generally radially extending push rod 76 or cam follower which is slidably disposed in a guide channel 78. The inner ends of the push rods are adapted to ride upon respective cam races which are associated with a tubular generally cup-shaped cam member 80 (see also FIG. 5) which is telescopically received over the driven shaft 22.

Figure 5:
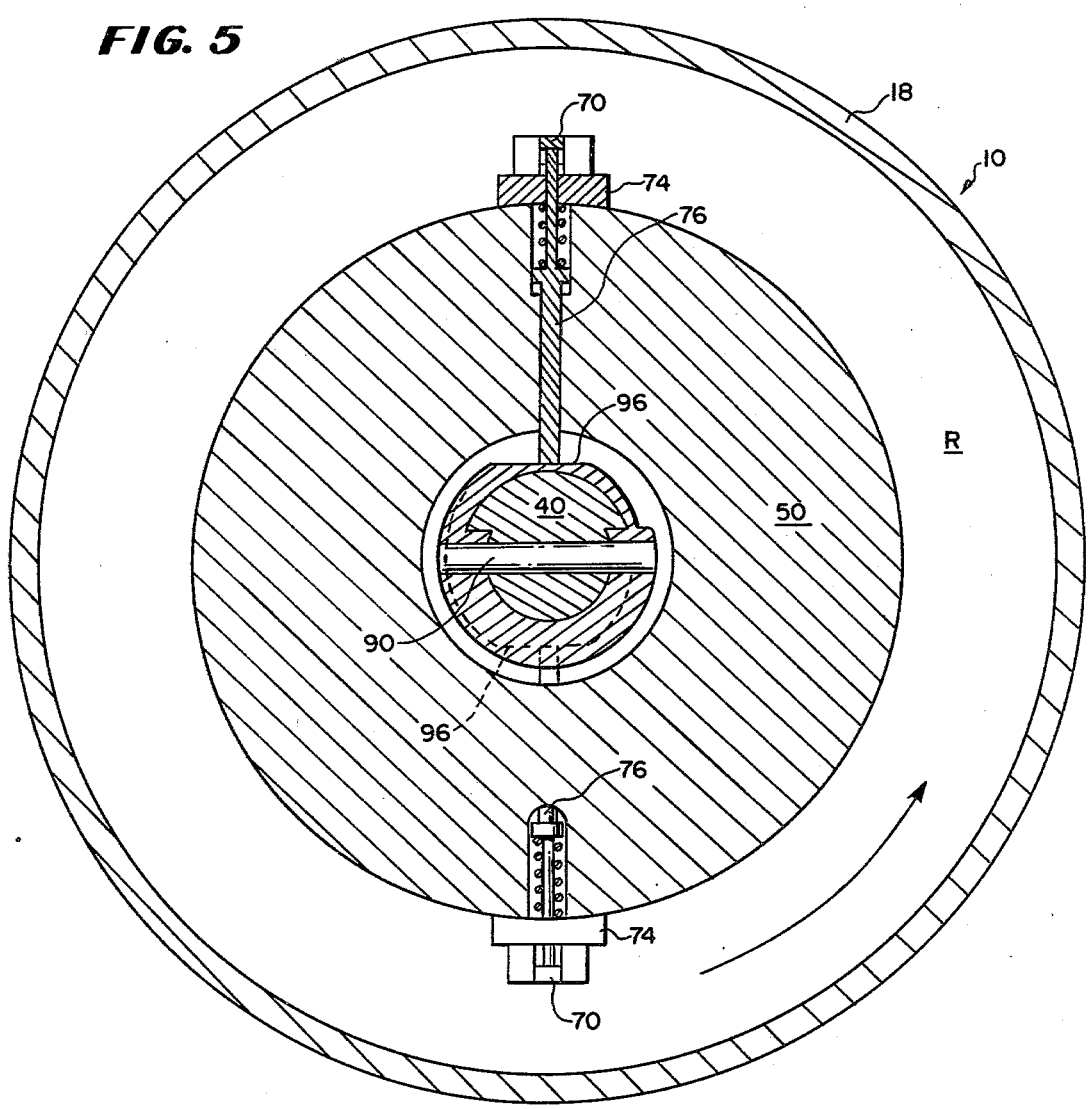
FIG. 5 is a sectional view taken substantially on the line 5—5 of FIG. 1.
Figure 6:
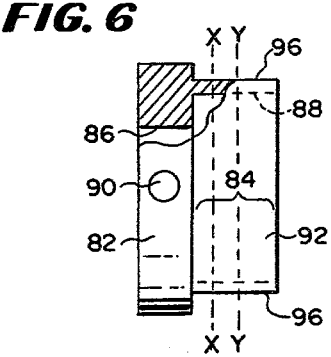
FIG. 6 is a side elevational view of a cam member which is employed in connection with the present invention.
Figure 7:
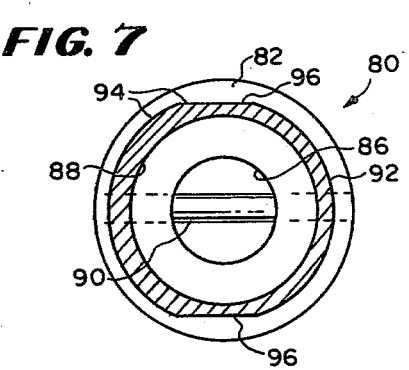
FIG. 7 is a right hand end view of the structure shown in FIG. 6.

The details of the tubular cam member 80 are best shown in FIGS. 5, 6 and 7 wherein it will be observed that such member is of open ended sleeve-like construction and it embodies a relatively thick or enlarged hub portion 82 of cylindrical design, and a forwardly extending cam race portion 84 which has been indicated by a bracket in FIG. 6. The cam member 80, which will hereinafter be referred to simply as the cam, is provided with a central bore 86 which extends through the hub portion and is adapted to fit over the output shaft 22 as shown in FIG. 1 while the cam race portion is formed with a counterbore 88 which is adapted to fit over the enlarged head 40 on the driven shaft 22 when the cam is in position on the shaft 22. A removable drive pin 90 projects through the hub portion 82 of the cam and through the driven shaft 22 and serves to maintain the cam in position on the shaft. By removing the drive pin, the cam may be rotated on the shaft 22 throughout an angle of 180°, after which the drive pin is replaced. This expedient is resorted to when the direction of rotation of the hydrostatic coupling is reversed as will be described in detail subsequently.

Approximately one half of the circumferential extent of the cam race portion 84 is semi-cylindrical as indicated at 92 in FIG. 7 but the other half constitutes an outwardly projecting cam lobe 94. The outer circumferential surface of the cam race portion 84 is common to both of the push rods 76 but, because the axes of the push rods are slightly separated in the longitudinal direction of the coupling, the inner ends of the push rods ride on the race portion 84 and follow spaced apart cam tracks or races, such cam races being designated by the dotted lines x—x and y—y in FIG. 6. The cam lobe 94 appears only in FIG. 7 inasmuch as in both FIGS. 1 and 6 this lobe is on the side of the cam remote from the eyes of the viewer.

It is to be noted at this point that the juncture regions between the low portion of the cam 80 and the high portion thereof establish short flats 96 (FIGS. 5, 6 and 7) which are diametrically opposed. As shown in FIG. 1, when the inner ends of both push rods 76 rest on these flat 96, the rocker arms 70 exert no pressure on the intake valves V1 and, as a consequence, these valves may assume their seated positions simultaneously under the influence of back-up pressure in the cylinders 76. As the cam 80 moves away from the position in which it is shown in FIG. 1, one of the push rods 76 will ride on the cam lobe 94 and be moved radially outwardly so as to cause forcible opening of its respective intake valve V1 for cylinder charging purposes, while the other push rod will ride on the cylindrical surface 92 so that its respective rocker arm 70 will remain inactive. The intake valves are thus actuated alternately during each cycle of operation of the coupling 10.

The aforementioned control valve arrangement which variously admits fluid from the manifold 60 back to the reservoir R is disclosed in FIG. 1. It embodies as functional elements thereof a series of three interrelated valve components including a control valve assembly CV, a metering valve MV and a pressure relief valve PRV.

Considering now the nature of the control valve assembly CV, this assembly embodies in its general organization a valve element or spool 100 which operates in a cylinder 102, the latter being radially disposed relative to the cylindrical casing 12. A spring 104 yieldingly biases the valve spool 100 to an inner retracted position wherein the inner end of the spool engages a threaded plug 106 which is received in the inner end of the cylinder. The valve cylinder 102 is provided with a normally open valve port a in the medial region thereof, this port normally remaining open when the valve spool 100 is in its retracted position and serving when open, to establish communication between the manifold 60 and the reservoir R through a pair of fluid channels 11 and 13. The control valve CV is of the balanced spool type wherein spring pressure is balanced against the action of centrifugal force on the spool 100. At such time as the casing 12 attains a predetermined maximum rate of rotation, the valve spool 100 is caused to be flung radially outwardly against the biasing action of the spring to such an extent that the port a becomes gradually closed. The rate of movement of the valve spool 100 is however not a direct function of the centrifugal force involved. Rather it is a function of the modifying action of the metering valve MV which communicates with the extreme outer end of the valve cylinder 102 by way of a fluid channel 15.

The metering valve MV is comprised of a valve element or spool 110 which cooperates with a valve port b that establishes communication between the channel 15 leading from the valve CV and a channel 17 leading to the reservoir R. The valve spool 110 is slotted for reception of a suitable adjusting tool such as a screwdriver or the like, and the cylincrical wall 18 of the casing 12 is equipped with a removable plug 112 in radial alignment with the valve spool 110. This plug, when removed, affords access to such valve spool for adjustment purposes.

From the above description it will be apparent that the rate of closing of the valve port a of the control valve CV by the centrifugally biased valve spool 100 is a function of the adjustment of the valve body 110 of the metering valve. The metering valve MV thus functions in the manner of a dash pot to bleed the fluid which is captured in the outer end of the spool cylinder 102 through the channel 15, valve port b and channel 17. The metering valve MV exerts a time delay upon the closing of the valve port a of the control valve CV and such time delay may range from a fraction of a second to several minutes.

As the port a gradually becomes closed, less and less fluid is able to pass from the manifold 60 through the passages 11 and 13 to the reservoir R and this regulates the rate at which back-up pressure is developed in the cylinders 48 for piston driving purposes. Finally, when the port a becomes fully closed, no fluid can escape from the manifold 60 to the reservoir R and the coupling becomes locked up or static so that the driven shaft 22 is constrained to rotate in unison with the driving shaft 20.

The function of the pressure relief valve PRV is to guard against an overload on the driven shaft 22. This pressure relief valve PRV, like the control valve CV, is also of the balanced spool type and it includes a shiftable valve spool 114 which operates in a radially disposed cylinder 116, the inner end of which communicates through a channel 19 with the manifold 60. The valve PRV is provided with a port c which establishes communication between the manifold 60 and the reservoir R through channels 21 and 23. A spring 118 yieldingly biases the spool 114 to an inner position within the cylinder 116 wherein the port c remains closed, the outer end of the spring bearing against a threaded plug 120 which is adjustably received in the outer end of the cylinder 116. The plug 120 is capable of being adjusted through an opening in the wall 18, such opening being normally closed by a removable plug 122. When the fluid pressure in the manifold 60 exceeds the pressure for which the spring 118 is set, fluid acting on the inner end of the spool 114 shifts the latter outwardly, thus opening the port c and allowing fluid to escape from the manifold 60 to the reservoir R through the channels 21 and 23. At such time as the pressure in the manifold 60 is relieved, the port c again becomes closed.

The previously described control valve has associated therewith a ball type check valve V3, the function of which is to enable the valve spool 100 of the control valve CV to move more rapidly to its initial starting position, thus opening the port a when shut down operations are initiated so that the casing decelerates. As previously described, when the port a becomes open, fluid will escape from the manifold 60 to the reservoir R through the channels 11 and 13, thus equalizing the pressure in these two fluid compartments. At this time as the casing 12 is brought to its position of rest, both the control valve CV and the pressure relief valve will assume their normal positions preparatory to a future starting up operation of the coupling 10.

From the above description it is believed that the nature and advantages of the herein described hydrostatic coupling 10 will be readily understood without further discussion.

It is to be noted at this point that the opening for either the plug 112 or the plug 122 may be used as a filling opening for the introduction of fluid into the casing 12.

The invention is not to be limited to the exact arrangement of parts shown in the accompanying drawings or described in this specification as various changes in the details of construction may be resorted to without departing from the spirit of the invention. For example, whereas the casing 12 is shown herein as embodying two substantially diametrically disposed cylinders 18 having respective pistons that are connected by eccentric crank mechanisms to the output shaft 22, it is within the purview of the invention to employ a larger number of such piston and cylinder arrangements appropriately circumferentially arranged within the casing. Therefore, only insofar as the invention has particularly been pointed out in the accompanying claims is the same to be limited.

Having thus described my invention, what I claim and desire to secure by Letters Patent is:

1. A hydrostatic coupling comprising a casing establishing an internal fluid reservoir including a peripherally disposed outer annular reservoir space and a centrally disposed inner reservoir space in communication with said outer space, a coaxial drive shaft carried by the casing, a driven shaft axially aligned with said drive shaft and projecting into said inner reservoir space in sealed relationship, radially disposed cylinders interiorly of the casing for rotation bodily therewith, means within the casing establishing a fixed volume manifold intermediate said outer and inner reservoir spaces and having plural channels leading therefrom to the reservoir, a crank head on said driven shaft, a piston for each cylinder reciprocable between inner and outer positions, an inflow check valve effective between each cylinder and the outer reservoir space for admitting centrifugally pressurized fluid to the cylinder for charging purposes to drive the piston to its inner position, an outflow check valve effective between each cylinder and the manifold, and valve means for controlling the flow of fluid through said channels and effective to variably bleed fluid from the manifold to the reservoir, and means responsive to rotation of the driven shaft relative to the drive shaft and engageable with the inflow valve for controlling the operation of the latter.

2. A hydrostatic coupling comprising a generally cylindrical casing, establishing an internal fluid reservoir including a peripherally disposed outer annular reservoir space and a centrally disposed inner reservoir space in communication with said outer space, a coaxial drive shaft carried by the casing, a driven shaft axially aligned with the drive shaft and projecting into said inner reservoir space in sealed relationship, radially disposed cylinders interiorly of the casing for rotation bodily therewith, means within the casing establishing a manifold intermediate said outer and inner reservoir spaces and having plural channels leading therefrom to the reservoir, a crank head on said driven shaft, a piston for each cylinder reciprocable between inner and outer positions, an inflow check valve effective between each cylinder and the outer reservoir space for admitting centrifugallly pressurized fluid to the cylinder for charging purposes to drive the piston to its inner position, an outflow check valve effective between each cylinder and the manifold for expelling fluid to the manifold, valve means for controlling the flow of fluid through said channels and effective to variably bleed fluid from the manifold to the reservoir, a cam mounted on said driven shaft, a cam follower cooperating with said cam, and means for translating the motion of said cam follower to said inflow valve.

3. A hydrostatic coupling as set forth in claim 1, wherein said valve means for controlling the flow of fluid through said channels includes a control valve having a radially disposed valve cylinder provided with a normally closed outer end and an inner end in communication with said reservoir, said cylinder defining an internal annular valve port, a first channel section leading from the manifold to said port, a second channel section leading from the valve port to the reservoir, a centrifugally responsive valve spool slidable in said valve cylinder between an inner retracted position wherein it uncovers said port and an outer advanced position wherein it closes said port, spring means yieldingly biasing said valve spool toward its retracted position, said valve spool being movable to its inner port closing position at such time as the casing attains a predetermined speed of rotation, and dashpot means for retarding the duration of movement of the valve spool toward its advanced position and comprising fluid channel means establishing a passageway which extends between the closed end of the valve cylinder and the reservoir, and a metering valve interposed in said fluid passageway and effective to regulate the flow of fluid through said passageway.

4. A hydrostatic coupling as set forth in claim 1, wherein said cam follower is in the form of a radially extending push rod which is slidable in said casing, said push rod having its inner end engageable with said cam, and having its outer end engageable with a rocker arm which bears against said inflow valve.

5. A hydrostatic coupling as set forth in claim 4, wherein said rocker arm is in the form of a lever of the first class having its fulcrum fixed relative to the casing, having one leg thereof positioned in the path of movement of said push rod, and having its other leg disposed in the path of movement of said inflow valve.

6. A hydrostatic coupling as set forth in claim 4, wherein said cam is provided with a cam lobe common to and effectively engageable with the push rods successively to open their respective inflow valves at the commencement of the charging strokes of their respective pistons, said inflow valves being responsive to back up pressure in the cylinders for their closing movements.

7. A hydrostatic coupling as set forth in claim 6, wherein said cam is of sleeve-like configuration and is telescopically mounted on the driven shaft, and means is provided for selectively securing the cam on the driven shaft in either of two positions disposed circumferentially 180° apart in order to accommodate rotation of the drive shaft in opposite directions.

8. A hydrostatic coupling as set forth in claim 6, wherein said driven shaft is provided with an enlarged crankhead on its projecting end within the casing and from which a crank arm projects forwardly, the cam is generally of cup-shaped configuration and embodies a hub portion which fits over the driven shaft, and a forwardly extending tubular cam race portion which fits over the crankhead, said cam lobe being formed on said cam race portion and being common to the inner ends of said push rods, and a drive pin for selectively securing the cam on the driven shaft in either of two positions disposed 180° apart.

9. A hydrostatic coupling as set forth in claim 1, wherein said valve means for controlling the flow of fluid through said channels includes a control valve having a normally open valve port, a radially shiftable centrifugally responsive valve spool movable into and out of cutoff relationship with respect to said port between a retracted position wherein the port is fully open and an advanced cutoff position wherein the port is fully closed, spring means yieldingly biasing said valve spool to its retracted position, said valve body being movable to its cutoff position at such time as the casing attains a predetermined speed of rotation, a first fluid channel section leading from the manifold to said port, and a second fluid channel section leading from the port to the reservoir.

10. A hydrostatic coupling as set forth in claim 9, wherein said second fluid channel leads from said port to the centrally disposed inner reservoir space.

11. A hydrostatic coupling as set forth in claim 9 including, additionally, means for varying the duration of movement of the valve spool from its retracted position to its advanced cutoff position.

12. A hydrostatic coupling as set forth in claim 11, wherein the means for retarding the duration of movement of the valve spool from its retracted position to its advanced position comprises dashpot means for dampening the movement of such valve spool in one direction.

13. A hydrostatic coupling as set forth in claim 12 including, additionally, check valve means for relieving the action of said dashpot means to enable the valve spool to move freely in the other direction 14. A hydrostatic coupling as set forth in claim 13, wherein said second channel section leads from said valve port to the inner reservoir space, and said passageway extends between the closed end of the valve cylinder and the inner reservoir space.

15. A hydrostatic coupling as set forth in claim 9, wherein said valve means further includes a pressure relief valve having a radially disposed cylinder the inner end of which is in communication with said manifold and the outer end of which is in communication with said reservoir, said latter cylinder defining an internal annular valve port, a first channel section leading from the manifold to said annular port, a second channel section leading from said annular port to said reservoir, a pressure responsive valve spool slidable in said valve cylinder between an inner advanced position wherein it closes said annular port and an outer retracted position wherein it uncovers such port, spring means yieldingly biasing said valve spool toward its inner advanced position, means for regulating the biasing action of said latter spring means, said valve spool being responsive to the pressure of fluid in said manifold and effective when such pressure exceeds the biasing action of said latter spring means to shift said valve spool to its retracted position to thus open said annular port.

16. A hydrostatic coupling as set forth in claim 15, wherein said second channel section leads from said annular port to the centrally disposed reservoir space.

* * * * *